United States Patent [19]

Nakajima

[11] 3,819,031

[45] June 25, 1974

[54] COAL RISING DEVICE FOR USE IN A FACE CONVEYOR

[75] Inventor: Shigeo Nakajima, Kushiro, Japan

[73] Assignee: Taiheiyo Coal Mining Co., Ltd., Tokyo, Japan

[22] Filed: Feb. 12, 1973

[21] Appl. No.: 331,478

[52] U.S. Cl. .............................. 198/172, 198/204
[51] Int. Cl. ............................................. B65g 19/00
[58] Field of Search .......... 198/205, 204, 188, 172, 198/173, 168

[56] References Cited
UNITED STATES PATENTS
2,386,717 10/1945 Sample .............................. 198/205

*Primary Examiner*—Richard E. Aegerter
*Attorney, Agent, or Firm*—George B. Oujevolk

[57] ABSTRACT

This invention relates to a resilient device for use in a face conveyor used for conveying coal when the face conveyor is equipped with a separator. Resilient elements are connected to a bottom plate of a separator frame or a face conveyor trough supporting the separator, and these resilient elements are adapted to permit only the conveyor chains and scrapers attached therebetween to pass between the separator and the bottom plate, without allowing the entry of coal.

1 Claim, 5 Drawing Figures

COAL RISING DEVICE FOR USE IN A FACE CONVEYOR

BACKGROUND OF THE INVENTION

The present invention relates to coal conveying and more particularly to the use of a resilient arrangement when transferring coal from a face conveyor onto a gate conveyor across a separator.

BRIEF DESCRIPTION OF THE PRIOR ART

Conventionally the discharge of coal from a face conveyor to a gate conveyor has been effected by means of the sprocket drums of the face conveyor. The method, however, has disadvantages that because the engine of the face conveyor being inwardly of the face, the coal side wall of the engine section must be put forward.

For overcoming this defect, another arrangement has been used wherein the separator is disposed close to the side of the coal with the face separated from the driving frame of the face conveyor, so as to locate the face engine outside of the face, so that the discharge of coal into the gate conveyor by means of the separator has become practical.

The method, however, has another disadvantage. Because of spacing for passing the conveyor chains and scrapers attached therebetween, a space is formed between the separator and the bottom plate of separator frame or face conveyor trough, stones and rocks occasionally pass between the separator and scrapers, resulting in frequent damages on the conveyor chains and breakages of the scrapers.

Accordingly, it is a prime object of the invention to provide a device for use in a face conveyor, to eliminate the disadvantage as described. Resilient members such as springs or an air-cushion rubber are connected to a bottom the separator frame or face conveyor trough, so as to prevent the entry of coal or the like into a spacing between the separator and scrapers as well as to discharge coal sidewards.

Another object of this invention is to provide a coal for use in a face conveyor, wherein resilient members, are interposed between a separator and a bottom plate of the separator frame or face conveyor trough, to as to prevent the entry of stones and rocks or coal between said separator and scrapers attached between conveyor chains and to allow the passage of the conveyor chains and scrapers only, whereby the discharge of coal onto the gate conveyor is effected without difficulty.

These and other objects of this invention will be apparent from the following descriptions with reference to accompanying drawings of the embodiments of this invention, and various modifications and changes in combination of respective components of this device and the operations thereof may be made for achieving these objects.

Figure 1:
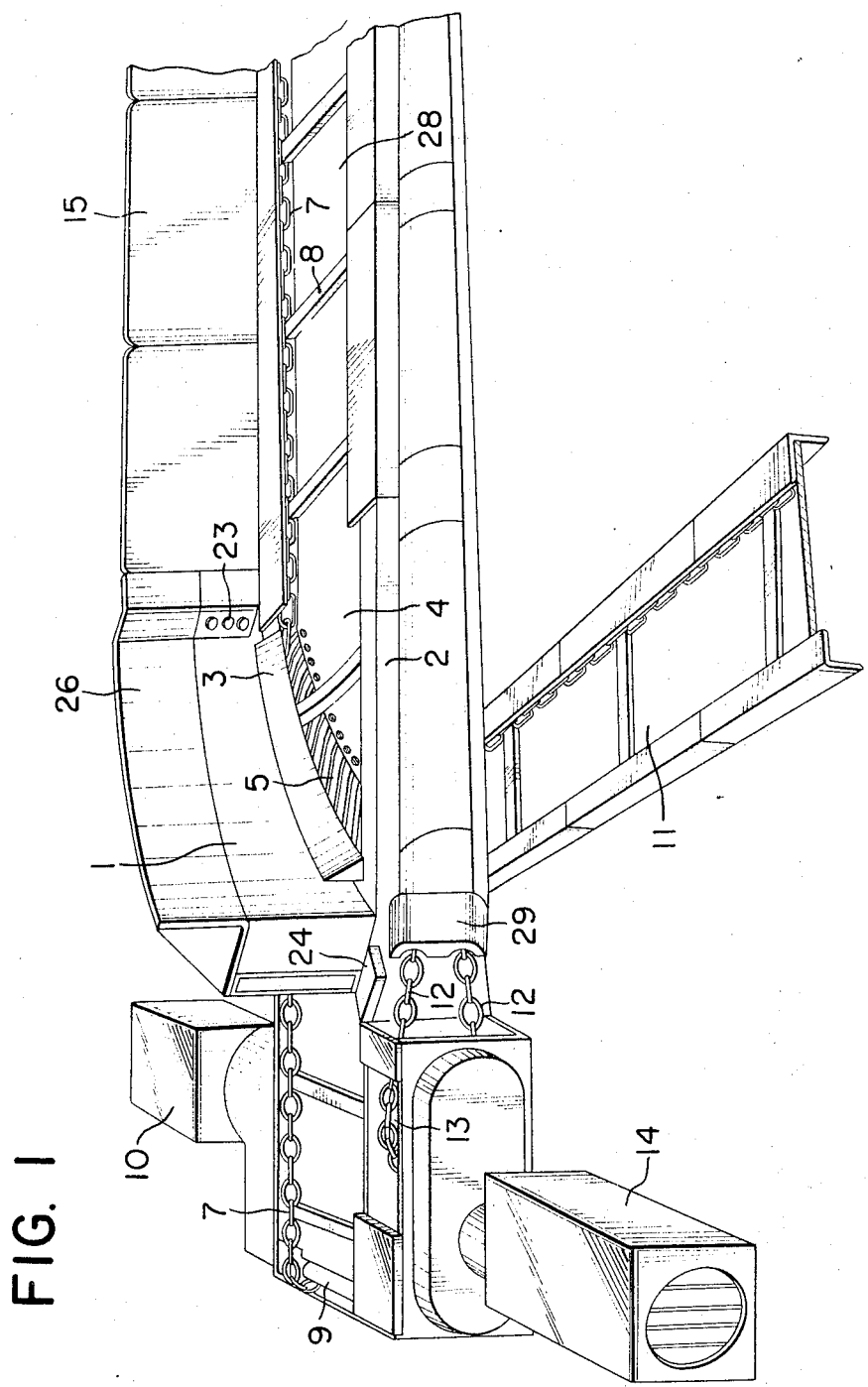
FIG. 1 is a perspective view showing a coal face conveyor, a separator and a gate conveyor as contemplated herein.

Shown at 1 is a separator for guiding coal advanced by a face conveyor onto a gate conveyor 11. Said separator is positioned on a separator frame 2 or the side walls of a face conveyor trough in a diagonal relation with respect to the moving direction of the conveyor chains, with one connecting end 21 bolted 23 to a supporting member 22 secured to one side wall of separator frame 2 or face conveyor trough and the other end bolted 25 on a projecting plate 24 extending from the other side wall of said separator frame or conveyor trough.

Said separator 1 is equipped with an auxiliary separator 26 bolted 27 on the upper face of said separator 1 and has a guide bar 3 of a triangular shape in cross section formed forwardly of said separator 1.

Figure 2:
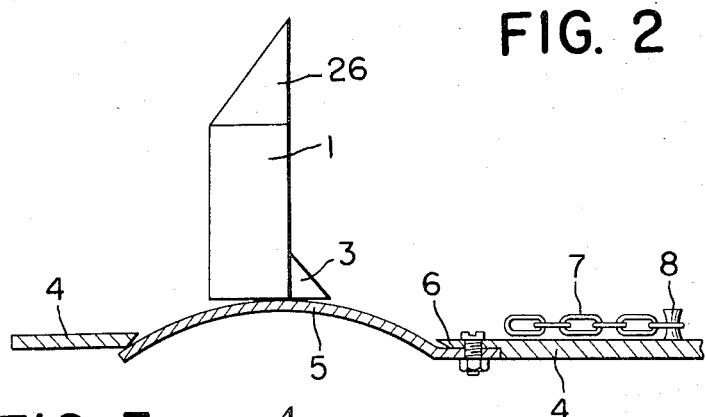
FIG. 2 is an enlarged sectional view of the resilient arrangement contemplated herein.

A bottom plate 4 between side walls of separator frame 2 or face conveyor trough is cut away around a portion contacting with a bottom of said separator 1, so as to receive therein a plurality of resilient members (as shown by FIG. 2), for example, a number of semi-ellipse leaf springs 5, 5 . . . . each having several centimeters in width. Said resilient members each are fastened at one end to one cut end of bottom plate 4 with the upper face thereof brought in contact with the under face of bottom of said separator 1. Shown at 7, 7 are a couple of endless face conveyor chains having plural scrapers 8 attached therebetween at a given spacing from each other. Said couple of conveyor chains are trained around wheels of sprocket drums 9 provided endwise of the trough in meshing relation therewith, and the driving force to said sprocket drums 9 is transmitted from a face conveyor motor 10 through a reduction gearing mechanism.

Numeral 12 is a Hobel chain connected to Hobel proper (not shown), said Hobel chain advancing or retracting the Hobel by a Hobel driving wheel 13.

In the drawings, reference numeral 14 is a Hobel motor, 15 is a spill plate, 28 is the face conveyor trough and 29 is a Hobel chain guide.

Operations of the device is as follows.

Coal or the like advanced by the face conveyor is regularly discharged by the separator 1 onto the gate conveyor 11. When the conveyor chains 7 and scrapers 8 attached therebetween at a given spacing travel along both sides of the face conveyor to reach the resilient members, viz., semi-ellipse leaf springs 5, 5 accommodated in the cut portion of the bottom plate of conveyor trough, said leaf springs are pushed downwardly by virtue of the traction and the tare of the scrapers 8, to form a spacing between the bottom of separator 1 and the springs 5, 5, whereby the scraper is allowed to pass therethrough with ease.

Immediately after each scraper 8 is passed, semi-ellipse leaf springs 5, 5 are returned to their initial condition into contact with the bottom of separator 1 as shown in FIG. 2, so as to block the entry of coal or the like.

Figure 3:
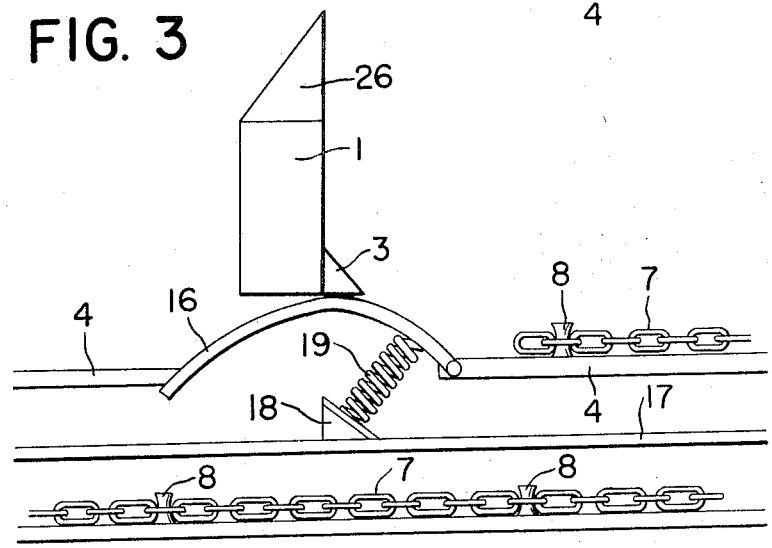
FIG. 3 and 4 are enlarged sectional views showing other embodiments of the resilient arrangement according to this invention.
Figure 4:
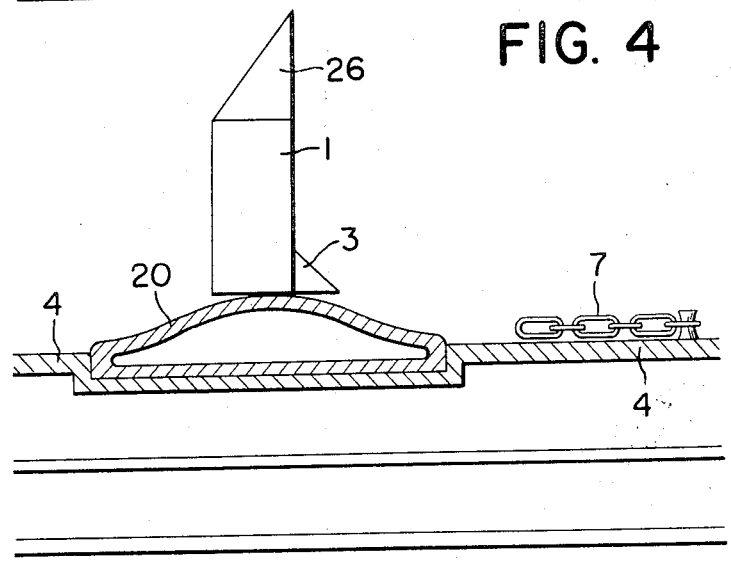
Figure 5:
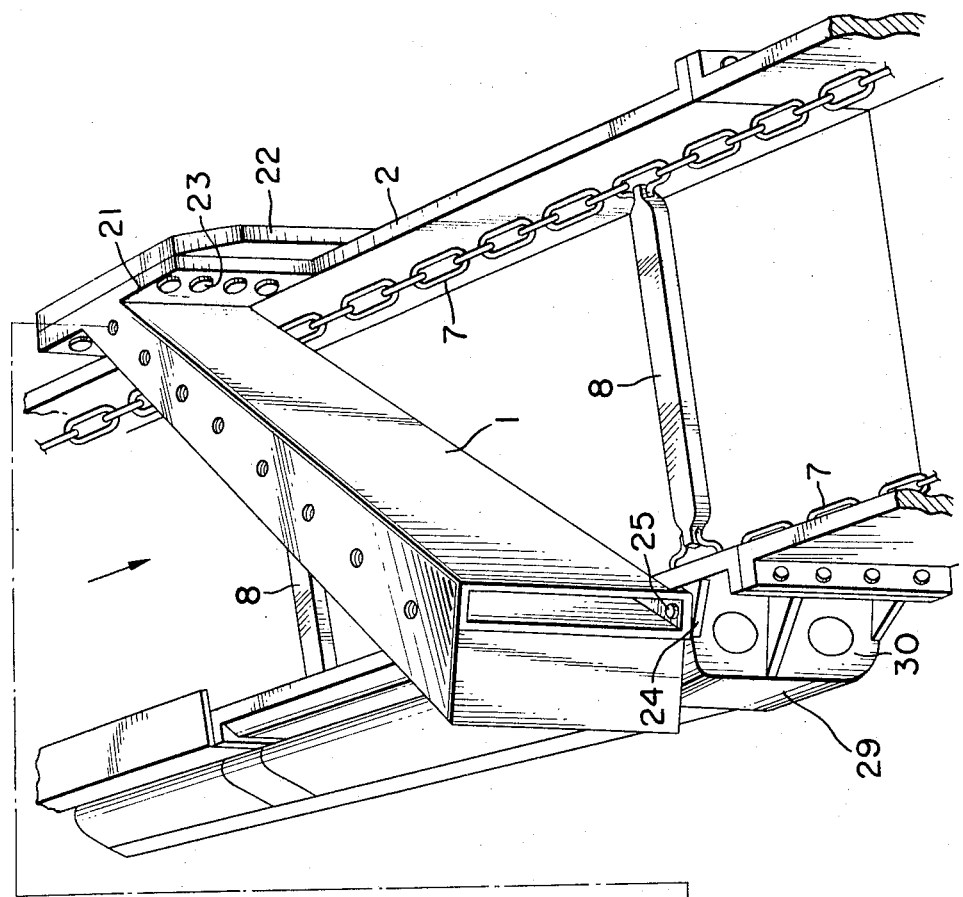
FIG. 5 is an enlarged perspective view showing a dismantled auxiliary separator and the separator in the installed state.
Figure 5:
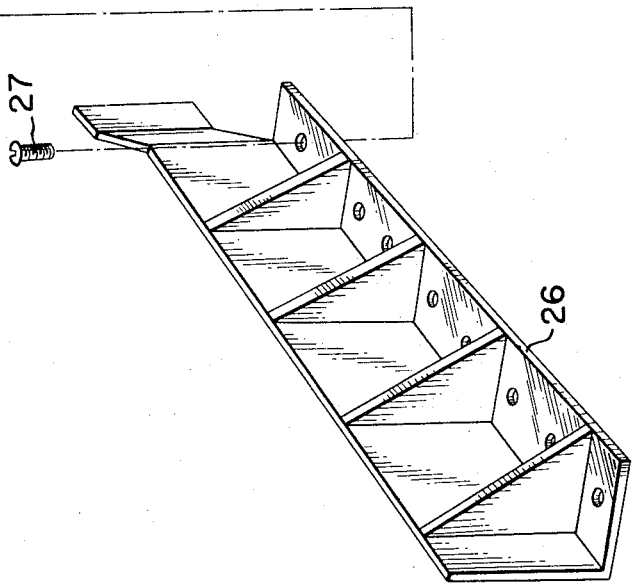

FIGS. 3 and 4 show other embodiments of the coal rising device of this invention.

In these drawings, reference numeral 16 is a resilient member, said resilient member being made of semi-ellipse leaf springs having several centimeters in width and interposed between the separator 1 and the bottom plate 4 of separator frame or face conveyor trough. In this embodiment, a number of semi-ellipse leaf springs 16 are aligned in a transverse row rotatably connected to one cut end of the bottom plate 4 and the other end underlapped by the other cut end of said bottom plate 4. Furthermore, there are provided a mounting 18 on a partition wall 17 secured to the separator frame 2, and springs 19 each having one end connected to said mounting 18 and the other end connected to the reverse face of each steel plate 16.

Thus, the bottom of separator 1 and the upper faces of steel plates 16, 16 are normally in contacting relation by the resilient force of coil springs 19, 19. When each scraper 8 is moved onto the semi-ellipse leaf springs 16, 16, said leaf springs are pressed downwardly by virtue of the traction and the tare of said scraper to form a spacing between the separator bottom 1 and said leaf springs 16, 16, to thereby allow the pass of said scraper 8. Said leaf springs, after the pass of the scraper 8, are brought their upper faces into contact with the bottom of separator 1 by the resilient force of the coil springs 19, 19, to restore the initial position, thereby preventing the intrusion of coal and rocks or the like.

The resilient member in FIG. 4 is of an air-cushion type 20 made of rubber having an ample elasticity. Said air-cushion rubber is fitted within a recess formed at the bottom plate 4 of separator frame or face conveyor trough with the upper face thereof brought in contact with the bottom of separator 1.

Thus, coal advanced by the face conveyor is guided by the separator to be discharged onto the gate conveyor. When the scraper 8 reaches the air-cushion rubber 20, said air-cushion rubber is compressed by virtue of the traction and the tare of said scraper to form a spacing between the bottom of separator and said rubber 20.

Various modifications and changes in details of construction may be made without departing from the spirit or the scope of claim for patent of this invention.

I claim:
1. A separator for guiding coal comprising in combination:
   a. a horizontal longitudinal face conveyor having a wide trough, with a coal delivery end, a horizontal gate conveyor (11) at said delivering end;
   b. separator frame means (1) with side walls (2), said frame means (1) being diagonally disposed across said horizontal longitudinal face conveyor at said delivering end, a guide bar (3) of triangular cross section connected to said separator frame means disposed to slantingly face oncoming coal traveling along said horizontal longitudinal face conveyor towards said delivering end;
   c. chain conveyor means having wide scrapers (8) spaced thereon disposed for longitudinally conveying coal along said horizontal longitudinal face conveyor including moving means to move said chain conveyor means, said scrapers (8) extending across the width of the face conveyor and moving coal towards said gate conveyor through said separator frame means;
   d. a bottom plate (4) between said side walls (2) with an aperture therein, a plurality of arcuate resilient members (5) the radius of curvature being in a plane substantially parallel to the longitudinal conveying direction disposed under said guide bar (3) so that said resilient members are normally in contact with the bottom of said guide bar (3) but are pushed down by the scrapers (8) as the scrapers travel over said resilient member forming a spacing to allow passage of the scrapers under the guid bars but returning to their original position so as to block the entry of coal.

* * * * *